United States Patent
Czaja et al.

(10) Patent No.: US 10,391,986 B2
(45) Date of Patent: Aug. 27, 2019

(54) METHOD FOR OPERATING AN ELECTRONIC BRAKE SYSTEM

(71) Applicant: WABCO GmbH, Hannover (DE)

(72) Inventors: Daniel Czaja, Hannover (DE); Axel Stender, Hameln (DE); Thomas Treichel, Berlin (DE); Markus Wolf, Hildesheim (DE)

(73) Assignee: WABCO GmbH, Hannover (DE)

( * ) Notice: Subject to any disclaimer, the term of this patent is extended or adjusted under 35 U.S.C. 154(b) by 15 days.

(21) Appl. No.: 15/317,943

(22) PCT Filed: May 22, 2015

(86) PCT No.: PCT/EP2015/001053
§ 371 (c)(1),
(2) Date: Dec. 11, 2016

(87) PCT Pub. No.: WO2015/188916
PCT Pub. Date: Dec. 17, 2015

(65) Prior Publication Data
US 2017/0106841 A1    Apr. 20, 2017

(30) Foreign Application Priority Data
Jun. 11, 2014 (DE) .................. 10 2014 008 562

(51) Int. Cl.
*B60T 8/17*     (2006.01)
*B60T 8/1755*   (2006.01)
(Continued)

(52) U.S. Cl.
CPC .......... *B60T 8/17551* (2013.01); *B60T 8/172* (2013.01); *B60T 2201/16* (2013.01);
(Continued)

(58) Field of Classification Search
CPC .. B60T 8/17551; B60T 8/172; B60T 2240/06; B60T 2240/04; B60T 2250/06; B60T 2201/16
See application file for complete search history.

(56) References Cited

U.S. PATENT DOCUMENTS

| 6,370,938 B1 | 4/2002 | Leimbach et al. |
| 6,424,907 B1 * | 7/2002 | Rieth ................. B60G 17/0162 340/438 |

(Continued)

FOREIGN PATENT DOCUMENTS

| DE | 19918525 A1 | 10/1999 |
| DE | 19918597 A1 | 11/2000 |

(Continued)

OTHER PUBLICATIONS

PCT/EP2015/001053 International Search Report dated Jul. 31, 2015, 6 pages.

(Continued)

*Primary Examiner* — Rodney A Butler
(74) *Attorney, Agent, or Firm* — Warner Norcross & Judd LLP

(57) ABSTRACT

A method for operating an electronic brake system in a vehicle having at least two tires on an axle, wherein the vehicle has a center of gravity (SP) with a height (hSP), is disclosed. According to the method, the height (hSP) of the center of gravity (SP) is calculated and used as a parameter by the electronic brake system. An electronic control unit, an electronic brake system, and a vehicle including the same for carrying out the method are also disclosed.

8 Claims, 1 Drawing Sheet

(51) Int. Cl.
*B60T 8/172* (2006.01)
*B60W 40/13* (2012.01)

(52) U.S. Cl.
CPC ....... *B60T 2240/04* (2013.01); *B60T 2240/06* (2013.01); *B60T 2250/06* (2013.01); *B60W 2040/1315* (2013.01)

(56) References Cited

U.S. PATENT DOCUMENTS

| | | | |
|---|---|---|---|
| 6,498,976 B1 | 12/2002 | Ehlbeck et al. | |
| 8,583,354 B2* | 11/2013 | Klier | B60W 40/12 180/282 |
| 2002/0165690 A1* | 11/2002 | Hessmert | B60G 17/019 702/169 |
| 2002/0183914 A1 | 12/2002 | Wetzel et al. | |
| 2003/0144767 A1* | 7/2003 | Brachert | B60C 19/00 701/1 |
| 2007/0078581 A1 | 4/2007 | Nenninger et al. | |
| 2009/0099718 A1* | 4/2009 | Kobetz | B60G 17/0164 701/31.4 |
| 2009/0119000 A1* | 5/2009 | Baumann | B60G 17/0162 701/124 |
| 2010/0036597 A1* | 2/2010 | Fiedler | B60G 17/019 701/124 |
| 2011/0224895 A1* | 9/2011 | Kroeger | B60G 17/0182 701/124 |
| 2012/0173133 A1* | 7/2012 | Ranc | B60T 8/172 701/124 |

FOREIGN PATENT DOCUMENTS

| | | |
|---|---|---|
| DE | 10014220 A1 | 9/2001 |
| EP | 0918003 A2 | 8/1998 |
| WO | WO0170549 A1 | 9/2001 |
| WO | WO02053432 A1 | 7/2002 |
| WO | WO2005039955 A2 | 5/2005 |

OTHER PUBLICATIONS

English language abstract and machine translation for DE19918525 (A1) extracted from http://worldwide.espacenet.com database on Aug. 25, 2016, 22 pages.

English language abstract and machine translation for DE19918597 (A1) extracted from http://worldwide.espacenet.com database on Aug. 25, 2016, 21 pages.

* cited by examiner

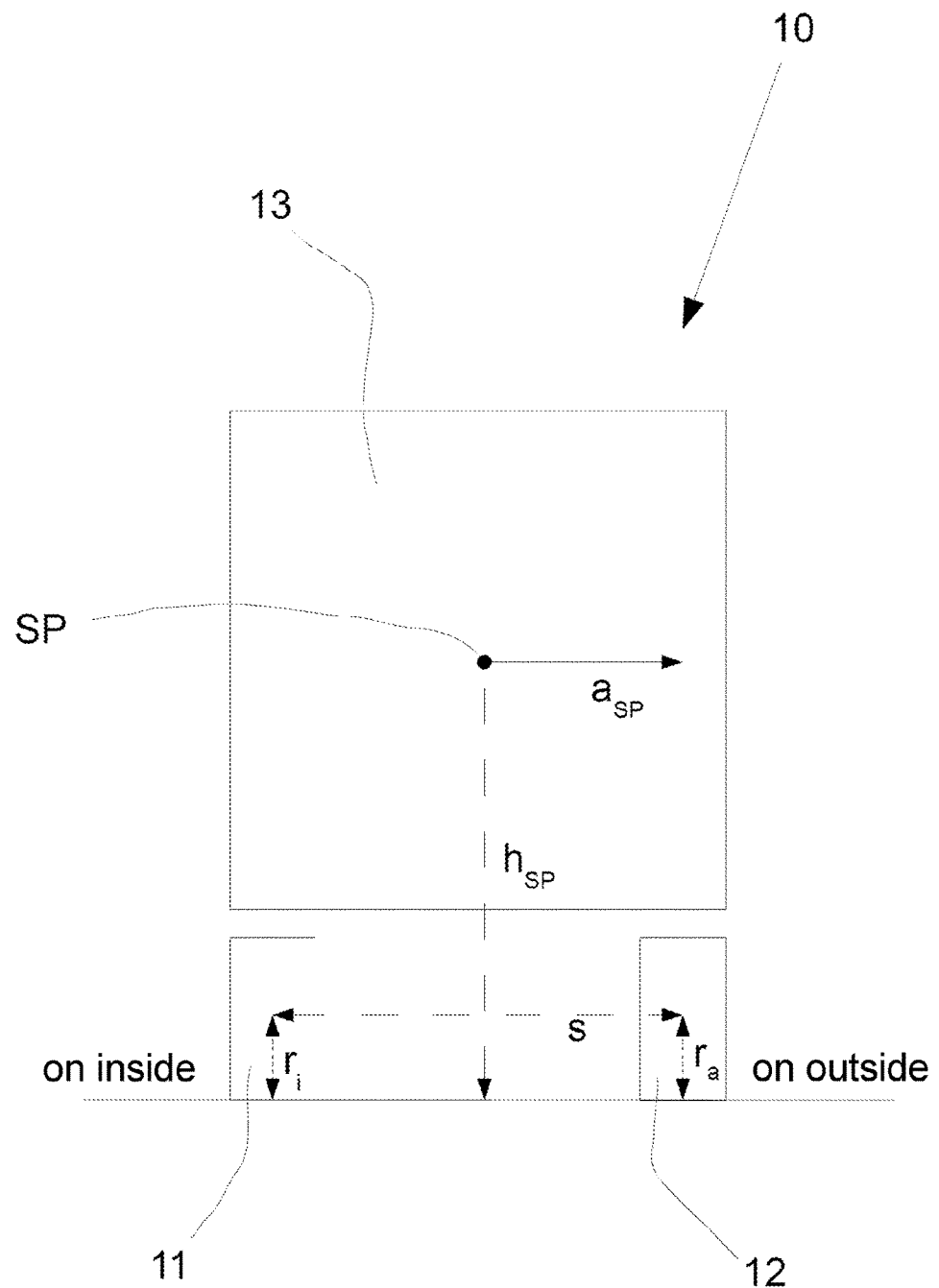

METHOD FOR OPERATING AN ELECTRONIC BRAKE SYSTEM

CROSS-REFERENCE TO RELATED APPLICATIONS

This application is the National Stage of International Application No. PCT/EP2015/001053, filed on 22 May 2015, which claims priority to and all advantages of German Patent Application No. 10 2014 008 562.7, filed on 11 Jun. 2014, the content of which is hereby incorporated by reference.

FIELD OF THE INVENTION

The invention relates to a method for operating an electronic brake system in a vehicle having at least two tires on one axle, wherein the vehicle has a center of gravity SP with a height $h_{SP}$. Furthermore, the invention relates to an electronic brake system and to an electronic control unit for carrying out the method, and to a vehicle having an electronic control unit and/or brake system.

BACKGROUND OF THE INVENTION

Utility vehicles are typically equipped with pneumatically activated brakes. The actuation is carried out by two systems, specifically primarily electronically and secondarily pneumatically. Owing to the electronic actuation, the system is also referred to as an electronic brake system (EBS).

The electronic actuation gives rise to a significantly faster response of the brakes than in the case of purely pneumatic actuation. This permits, in conjunction with wheel speed sensors and a transverse acceleration sensor, a variety of safety functions such as an anti-lock brake function and traction control function. Stability control is also possible. Owing to the load, utility vehicles can have such a high center of gravity that tilting can occur when cornering. This applies, in particular, to trailer vehicles. Among other things, the respective axle load and the height of the center of gravity are significant for the stability control. The axle load is determined in mechanically sprung vehicles using a travel sensor, and in pneumatically sprung vehicles via a bellows pressure sensor and a travel sensor. Until now, it has only been possible to estimate the height of the center of gravity as a fixed variable.

SUMMARY OF THE INVENTION

One object of the present invention is to provide a method for operating an electronic brake system with the possibility of improved stability control.

The method according to the invention calculates the height $h_{SP}$ of the center of gravity SP as a parameter by the electronic brake system, or as an input variable for regulating functions. As a result of the use of a calculated height $h_{SP}$, more precise stability control and other functions can be executed.

In certain embodiments, the height $h_{SP}$ of the center of gravity SP is determined as a function of a difference between wheel speeds at a wheel on an inside of a bend and a wheel on an outside of the bend when cornering.

During cornering a difference in rotational speed occurs between the inner wheel and the outer wheel which is understood to be dependent on the track width of the vehicle and on the radius of the bend being travelled through, that is to say without taking into account a load. The radius of the bend arises indirectly from the speed of the vehicle and the transverse acceleration which occurs. A typical electronic brake system has a transverse acceleration sensor and wheel speed sensors, and it is generally possible to obtain the theoretical difference between the wheel speeds owing to the cornering from the data of sensors which are present.

However, the measured difference between the wheel speeds is greater than the theoretical difference between the wheel speeds because air-filled tires deform unequally during cornering. Owing to the load, the deformation of the tires on the outer wheels gives rise to a smaller effective tire radius, while the effective radius of the inner wheels becomes larger. The effect is stronger the higher the center of gravity of the load above the wheels. Given data which is otherwise constant, the difference between the measured difference between the wheel speeds and the theoretical difference between the wheel speeds is therefore a measure of the height of the center of gravity SP.

In certain embodiments, the height $h_{SP}$ of the center of gravity SP is determined as a function of track width s, transverse acceleration $a_{SP}$ and axle load m. The track width s relates to the two tires or the distance from the center of one tire to the center of the other tire, and is constant. The transverse acceleration $a_{SP}$ which occurs is measured by the transverse acceleration sensor. Likewise, the axle load m is obtained from data of sensors which are present, for example from data from travel sensors assigned to a vehicle suspension system, or bellows pressure sensors and travel sensors of a pneumatic suspension system.

In certain embodiments, the height $h_{SP}$ of the center of gravity SP is determined as a function of data from sensors for monitoring the state of the tires. Vehicles can be equipped with sensors which, for example, measure the pressure and/or the temperature directly at the tire. If the tires become warmer in the course of a journey, an increase in pressure occurs, with the result that the deformation of the tire as a function of the load becomes smaller during cornering. The calculated height of the center of gravity in the course of a journey is also correspondingly reduced as the heating of the tires increases. Given knowledge of the changing temperature and/or of the pressure, a correction factor can be provided for the calculation of the height of the center of gravity, either via a characteristic curve or by adding to the calculation for the determination of the height of the center of gravity. This applies analogously to a reduction in temperature and pressure, for example as a result of the changeover from a sunny, dry road to a winter road which is in shadow and has not been cleared of snow.

The height of the center of gravity can be newly determined at each new cornering operation. In particular, average values can be formed with the previously applicable height of the center of gravity. Weighted formation of average values can also be provided for example, in such a way that the value determined last has a higher weighting than the value determined previously.

In certain embodiments, the height $h_{SP}$ of the center of gravity SP is determined as a function of a reference signal, which may be determined iteratively, wherein the reference signal relates to a parameter which, on the one hand, can be calculated using an assumed height of the center of gravity and which, on the other hand, is measurable or can be derived from a measurement. For the calculation of the height hap, use may be made, inter alia, of current measured values from sensors which are present on the vehicle. This results in at least one reference signal which has been produced by measurement and is referred to, for the sake of simplification, as the measured reference signal. In parallel with this it is possible to calculate the reference signal, specifically by using an estimated value for the height $h_{SP}$. An estimated value of the height $h_{SP}$ can be, for example, the largest possible height $h_{SP}$ for the respective vehicle. The reference signal which is calculated using the estimated height $h_{SP}$ is then compared with the measured reference signal. Depending on the result of the comparison, a new calculation is carried out using a different estimated value of the height $h_{SP}$. This iteration is carried out until the calculated reference signal corresponds to the measured reference signal. The height $h_{SP}$ which is obtained in this way is then the actual calculated height $h_{SP}$. As a result of the iteration, the height of the center of gravity can be determined relatively accurately. Constant offsets/systematic errors can be determined. Relevant parameters (e.g. tire parameters) can be checked in terms of their effect on the calculated result within the scope of plausibility checking. In addition, further parameters which have been specified during the parameterization and activation of the vehicle and which give details on the vehicle properties (e.g. number of axles, geometric data, type of tires etc.) can be used for the later calculations.

In specific embodiments, the transverse acceleration $a_{SP}$ is used as a reference signal. A transverse acceleration sensor, which supplies a reliable measured reference signal, is typically present in the electronic brake system. There is also a relationship, which can be calculated well, between the height of the center of gravity and the transverse acceleration which is critical for tilting.

In certain embodiments, the calculation of the height of the center of gravity is carried out as a function of measured values occurring during cornering of the vehicle. In the case of straight-ahead travel of the vehicle a systematic error/a constant offset of the calculation is determined in advance, for example by defining a reference signal as zero or as some other value which is typical of straight-ahead travel. Therefore, for example the transverse acceleration in the case of straight-ahead travel is equal to zero. If the measurement of the transverse acceleration in the case of straight-ahead travel yields a value which is different from zero, a systematic error/a constant offset for the further calculation can be determined from this deviation with respect to the reference signal. Particularly the use of the transverse acceleration as a reference signal is suitable for determining constant offsets/systematic errors as in the case of straight-ahead travel.

The calculation of the height of the center of gravity is typically started anew after changing the load of the vehicle, after resets of the involved electronic control units, after the activation of the ignition or of the starter of the vehicle and/or after other events which are relevant to the calculation of the height of the center of gravity.

The calculation of the height of the center of gravity is typically carried out only within "stable" operating states, for example not when braking the vehicle or only below defined critical values of the transverse acceleration.

The method according to the invention can advantageously be used for all two-track vehicles with tires, wheel speed sensors, transverse acceleration sensor and axle load sensors (travel sensor, bellows pressure sensor), in particular utility vehicles or trailer vehicles with an electronic brake system. However, the method can also be used for passenger cars or other vehicles with hydraulic brakes in so far as the electronic brake system utilizes estimation of the height of the center of gravity.

Also provided is an electronic brake system for a vehicle, in particular for a trailer vehicle. The electronic brake system determines the height of the center of gravity according to the method described above. In this context, the brake system typically checks whether a critical driving state is present while taking into account the height of the center of gravity, in particular tilting of the vehicle is to be prevented.

Further provided is an electronic control unit for carrying out the method described above, in particular a brake control unit. The method and the parameters necessary for said method can be a component of the software of the control unit. For example the electromagnetic regulating valves of compressed air brakes are actuated with the brake control unit within the scope of an electronic brake system.

Finally, a vehicle is provided which has an electronic control unit or which has an electronic brake system, each as explained above. The vehicle has, in particular, compressed air brakes, wheel speed sensors, a transverse acceleration sensor, travel sensors and/or bellows pressure sensors.

BRIEF DESCRIPTION OF THE DRAWINGS

The invention is described in greater detail below with reference to the accompanying drawing FIGURES, in which:

FIG. 1 shows a simplified rear view of a vehicle 10 with two rear wheels 11, 12 and a box-shaped body 13.

DETAILED DESCRIPTION

Referring to FIG. 1, the vehicle 10 can be a traction vehicle or a trailer vehicle and is equipped in a manner known per se with compressed air brakes, wheel speed sensors, an electronic brake system, a brake control unit with a transverse acceleration sensor and with travel sensors or bellows pressure sensors for determining an axle load.

Cornering is assumed, with the wheel 11 as a wheel on the inside of the bend and the wheel 12 as a wheel on the outside of the bend. In this context, a transverse acceleration $a_{SP}$ acts on a center of gravity SP of the vehicle 10. The center of gravity SP is at a height $h_{SP}$.

The center of gravity SP is assumed here to be a location of an axle load acting on the wheels 11, 12. The axle load results in tire deformation at the wheels 11, 12, which tire deformation depends on the transverse acceleration $a_{SP}$ which is occurring. The effective tire radius $r_a$ of the wheel 12 on the outside of the bend decreases, while the effective tire radius $r_i$ of the wheel 11 on the inside of the bend increases somewhat. This effect is used for the calculation of the height $h_{SP}$ of the center of gravity SP.

An exemplary calculation example for the determination of the height $h_{SP}$ from the tire deformation and the resulting difference in the wheel speeds during cornering is represented below:

The height $h_{SP}$ of the center of gravity of the vehicle is to be calculated by way of example on the basis of the data of one axle Measured speed of the vehicle at the center of gravity is $$v_{SP} = 11 \frac{m}{s}$$

(can be determined from an average value of the wheel speeds, derived from the values of wheel speed sensors of the respective axle or of all of the wheel speed sensors)

Measured transverse acceleration during constant cornering is $a_{SP}$=0.15 g=1.47 m/s² (from the signals of a transverse acceleration sensor)

Measured axle load is m=7000 kg, determined via a travel sensor in the chassis or by means of bellows pressure and travel sensor in the case of air suspension, or determined via evaluation of the slip behavior of the wheels Track width is s=2.0 m (vehicle constant or obtained from vehicle parameterization)

Tire radius is $r_0$=0.517 m (measurement in a stationary state or constant dependent on the type of tire or basic value obtained from vehicle parameterization, fine adjustment and determination in the case of straight-ahead travel via internal functions)

Tire rigidity is $$C_R = 1/(2.1*10^6)\frac{m}{N}$$

(constant dependent on the type of tire)

Wheel differential speed $\Delta V_M$ (outer/inner) measured during cornering=0.37 m/s.

The vehicle drives at 11 m/s. During cornering with a transverse acceleration of 0.15 g, a difference $\Delta V_M$ between the wheel speeds of 0.37 m/s is measured between the wheel on the inside of the bend and the wheel on the outside of the bend.

The theoretical difference between the wheel speeds calculated from the track width and the transverse acceleration is $\Delta V_A$:

$$\Delta V_A = v_{Aa} - v_{Ai} = \frac{a_{SP}}{v_{SP}} \times s = 0.26 \text{ m/s} \quad \text{(Equation 1)}$$

The difference $\Delta V_R$ between the theoretical difference $\Delta V_A$ between the wheel speeds and the measured difference $\Delta V_M$ between the wheel speeds is here:

$$\Delta V_R = 0.37 \text{ m/s} - 0.26 \text{ m/s} = 0.11 \text{ m/s} \quad \text{(Equation 2)}$$

The reason for the difference $\Delta V_R$ is the tire deformation during cornering, which deformation brings about a change in the tire radius. The tire deformation is caused by the outwardly directed centrifugal force owing to mass inertia. A reduction in the tire radius occurs at the wheels on the inside of the bend and an increase in the tire radius on the outside. The higher the axle load and the center of gravity, the greater the tire deformation. The tire deformation and axle load can be calculated and measured, and the height of the center of gravity can then be calculated.

The difference $\Delta V_R$ also results from the speeds of the wheel speeds $v_{Ra}$ and $v_{Ri}$ measured on the outside of the bend and the inside of the bend, caused by tire deformation:

$$v_{Ra} - v_{Ri} = \Delta V_R \quad \text{(Equation 3)}$$

The speed (translatory wheel speed), tire radius and rotational speed are dependent on one another:

$$\Delta V_R = \omega * \Delta r \quad \text{(Equation 4)}$$

$$\omega = \frac{v_{SP}}{r_0} \quad \text{(Equation 5)}$$

Equation 4 with equation 5 yields:

$$\frac{1}{2}*\Delta V_R = \left(\frac{v_{SP}}{r_0}*\Delta r\right)*\frac{1}{2} \quad \text{(Equation 6)}$$

and $$\Delta r = \Delta V_R * \frac{r_0}{v_{SP}} = 0.11\frac{m}{s} * \frac{0.517 \text{ m}}{11\frac{m}{s}} \approx 0.005 \text{ m} \quad \text{(Equation 7)}$$

The change $\Delta r$ in radius is obtained from the change $\Delta F$ in the wheel load and the tire rigidity $C_R$:

$$\Delta r = \frac{\Delta F}{C_R} \text{ with } C_R = 1/(2.1*10^6)\frac{m}{N} \quad \text{(Equation 8)}$$

And also yields:

$$\Delta F = \frac{\Delta r}{C_R} = 0.005 \text{ m}*2.1*10^6\frac{N}{m} = 10500 \text{ N} \quad \text{(Equation 9)}$$

The change $\pm\Delta F$ in wheel load per wheel at an axle is obtained from:

$$\Delta F = \frac{a_{SP}*m*h_{SP}}{s} \quad \text{(Equation 10)}$$

The calculated height of the center of gravity follows from this:

$$h_{SP} = \frac{\Delta F * s}{a_{SP}*m} = \frac{10500 \text{ N}*2 \text{ m}}{1.47 \text{ m/s}^2 * 7000 \text{ kg}} \approx 2.04 \text{ m} \quad \text{(Equation 11)}$$

It is possible to assume a height of the center of gravity in the region of approximately 2 m. The method serves to estimate the vehicle properties. It is sufficient here to differentiate, for example, between a fully loaded vehicle with a very low center of gravity (steel plates loaded), a vehicle with a very high center of gravity. This information can be made available to e.g. stability regulating functions which can adjust their method of functioning (e.g. activation limits or intervention intensity) in this way to the individual vehicle with a load.

In a second exemplary embodiment, the height $h_{SP}$ of the center of gravity SP is determined by iteration. It is possible to use for this the transverse acceleration $a_{SP}$. The equation 10 is resolved according to the transverse acceleration $a_{SP}$. An estimated value is assumed for the height $h_{SP}$, e.g. a relatively improbable high value of 3.5 m for the vehicle. The other values for F, m and s are as in the first exemplary embodiment. This results in a calculated transverse acceleration $a_{SP}$ of 0.857 m/s² and therefore a significant difference from the transverse acceleration of 1.47 m/s² measured in the first exemplary embodiment.

In a subsequent step, a relatively low estimated value of the height $h_{SP}$ is used, e.g. 3 m. With this estimated value a calculated transverse acceleration $a_{SP}$ of 1 m/s² is obtained. There is still a significant difference from the measured transverse acceleration $a_{SP}$ of 1.47 m/s². The iteration is therefore carried out until the calculated transverse acceleration and the measured transverse acceleration correspond approximately. The estimated value last used for the height $h_{SP}$ then corresponds approximately to the actual height of the center of gravity.

In addition, a calibration process can be carried out before the calculation of the height of the center of gravity. In the case of straight-ahead travel of the vehicle, no transverse acceleration occurs. If, nevertheless, a transverse acceleration which is different from zero is measured, this deviation can be included as a systematic error in the further calculations. The straight-ahead travel can be determined, for example, by comparing the measured values of wheel speed sensors on both sides of the vehicle, even in conjunction with measured values of tire pressure sensors.

What is claimed is:

1. A method for operating an electronic brake system in a vehicle having at least two tires on one axle, wherein the vehicle has a center of gravity (SP) with a height ($h_{SP}$), said method comprising:
   providing a transverse acceleration sensor adapted to measure a transverse acceleration ($a_{SP}$) of the vehicle;
   iteratively calculating the height ($h_{SP}$) of the center of gravity (SP) as a parameter by the electronic brake system to determine whether a critical driving state is present, wherein iteratively calculating the height ($h_{SP}$) of the center of gravity (SP) is performed by an electronic control unit and includes: estimating the height of the center of gravity of the vehicle, calculating a transverse acceleration based on the estimated height of the center of gravity of the vehicle, and comparing the calculated transverse acceleration with the measured transverse acceleration ($a_{SP}$) from the transverse acceleration sensor, wherein, if the calculated transverse acceleration does not approximately correspond to the measured transverse acceleration ($a_{SP}$), repeating the iterative calculation by estimating a different height of the center of gravity of the vehicle; and
   operating a brake control unit of the vehicle while the vehicle is cornering based on the iteratively calculated height ($h_{SP}$) of the center of gravity (SP) of the vehicle to prevent the vehicle from overturning.

2. The method as claimed in claim 1, wherein the height ($h_{SP}$) of the center of gravity (SP) is further determined as a function of a difference between wheel speeds at a wheel on an inside of a bend and a wheel on an outside of the bend when cornering.

3. The method as claimed in claim 1, wherein the height ($h_{SP}$) of the center of gravity (SP) is iteratively calculated as a function of track width (s) and axle load (m).

4. The method as claimed in claim 1, wherein the height ($h_{SP}$) of the center of gravity (SP) is further determined as a function of data from sensors for monitoring the state of the tires.

5. The method as claimed in claim 1, wherein the calculation of the height ($h_{SP}$) of the center of gravity (SP) is further carried out as a function of measured values occurring during straight-ahead travel of the vehicle using a systematic error or a constant offset of the calculation is determined in advance.

6. The method as claimed in claim 5, wherein in the case of straight-ahead travel of the vehicle the systematic error or the constant offset of the calculation is determined in advance by defining a reference signal as zero or other known value.

7. An electronic control unit for a vehicle having a transverse acceleration sensor and a center of gravity (SP) with a height ($h_{SP}$), the electronic control unit being adapted to perform the following method steps:
   iteratively calculate a height ($h_{SP}$) of the center of gravity (SP) to determine whether a critical driving state is present by estimating the height ($h_{SP}$) of the center of gravity (SP), calculating a transverse acceleration based on the estimated height of the center of gravity (SP) and comparing the calculated transverse acceleration with a measured transverse acceleration ($a_{SP}$) from the transverse acceleration sensor, wherein, if the calculated transverse acceleration does not approximately correspond to the measured transverse acceleration ($a_{SP}$), repeating the iterative calculation by estimating a different height ($h_{SP}$) of the center of gravity (SP); and
   cause operation of a brake control unit of the vehicle while the vehicle is cornering based on the iteratively calculated height ($h_{SP}$) of the center of gravity (SP) of the vehicle to prevent the vehicle from overturning.

8. A vehicle having a center of gravity (SP) with a height ($h_{SP}$), the vehicle comprising:
   at least two tires on one axle;
   a transverse acceleration sensor to measure a transverse acceleration ($a_{SP}$) of the vehicle;
   an electronic control unit adapted to perform the following method steps:
   iteratively calculate the height ($h_{SP}$) of the center of gravity (SP) to determine whether a critical driving state is present, wherein iteratively calculating the height ($h_{SP}$) of the center of gravity (SP) includes: estimating the height ($h_{SP}$) of the center of gravity of the vehicle (SP), calculating a transverse acceleration based on the estimated height of the center of gravity (SP) and comparing the calculated transverse acceleration with a measured transverse acceleration ($a_{sp}$) from the transverse acceleration sensor, wherein, if the calculated transverse acceleration does not approximately correspond to the measured transverse acceleration ($a_{SP}$), repeating the iterative calculation by estimating a different height ($h_{SP}$) of the center of gravity (SP); and
   operate a brake control unit of the vehicle while the vehicle is cornering based on the iteratively calculated height ($h_{SP}$) of the center of gravity (SP) of the vehicle to prevent the vehicle from overturning.

* * * * *